July 17, 1951 R. B. GIBNEY 2,560,792

ELECTROLYTIC SURFACE TREATMENT OF GERMANIUM

Filed Feb. 26, 1948 2 Sheets-Sheet 1

INVENTOR
R. B. GIBNEY
BY Harry C. Hart
ATTORNEY

July 17, 1951 R. B. GIBNEY 2,560,792

ELECTROLYTIC SURFACE TREATMENT OF GERMANIUM

Filed Feb. 26, 1948 2 Sheets-Sheet 2

INVENTOR
R.B. GIBNEY
BY
Harry C. Hart
ATTORNEY

Patented July 17, 1951

2,560,792

UNITED STATES PATENT OFFICE 2,560,792

ELECTROLYTIC SURFACE TREATMENT OF GERMANIUM

Robert B. Gibney, Morristown, N. J., assignor to Bell Telephone Laboratories, Incorporated, New York, N. Y., a corporation of New York Application February 26, 1948, Serial No. 11,167

9 Claims. (Cl. 175—366)

This invention relates to semiconductor devices of the type which conduct electric current more readily in one direction than in the opposite direction and to methods of making them. More particularly, it relates to such devices which include a body of germanium material.

The general object of the invention is to provide an improved method of treating germanium material to invest it with certain desirable characteristics. A more specific object is to treat a block or slab of germanium whose conductivity is of one type in such a way as to form a thin surface layer whose conductivity is of a different type, and to provide a high resistance barrier between the layer and the body of the block.

A still more specific object is to treat a slab of germanium material in such a way that its surface possesses a conductivity characteristic of one type while, with respect to the same electrodes, the block as a whole manifests a rectification characteristic of opposite type.

Subsidiary objects are to provide a block of germanium material suitable for use as an amplifier of electric signals; to provide an amplifier unit which requires neither a heated cathode nor an evacuated envelope; and to develop semiconductor materials for new uses.

The invention, together with the manner in which it serves to attain the foregoing and other objects, will be fully apprehended from the following detailed description of a preferred embodiment thereof, taken in connection with the appended drawings, in which.

Figure 1:
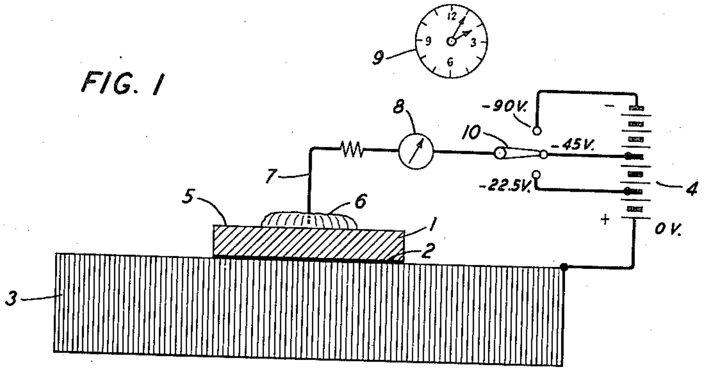
Fig. 1 is a schematic diagram of apparatus which may be employed in carrying out the process of the invention.

Semiconductors such as are employed in dry rectifiers and like devices have been classified as excess semiconductors or as defict semiconductors. These two types have also been denoted electronic or "N-type" semiconductors and hole or "P-type" semiconductors, respectively. The theory is that certain impurities in the material of the semiconductor proper upset the electronic equilibrium of the atomic structure by the addition or subtraction of electrons. (The term "impurities" is intended to include intentionally added constituents as well as any which may be included in the basic material as found in nature or as commercially available.) Germanium is such a material, which, along with some representative impurities, may be treated by the process of the invention to give desirable characteristics. Silicon is another such material.

In United States Patent 2,524,033 there is described an electric circuit device having three terminals and which operates to furnish in an output circuit an amplified replica of a signal applied to an input circuit. This patent issued on October 3, 1950, on an application of John Bardeen and W. H. Brattain, Serial No. 33,466, filed June 17, 1948, now Patent No. 2,524,035, which was a continuation-in-part of an earlier application Serial No. 11,165, filed February 26, 1948, and after the filing of the later application allowed to become abandoned. The heart of the device, which has now been named a "Transitor," is a block of semiconductor material one surface of which has been specially formed. It is believed that the result and effect of the forming process is to produce a very thin layer of semiconductor material of one conductivity type (P or N) separated by a high resistance barrier from the main body of the block which is of the opposite (N or P) conductivity type.

It is known how to fabricate a block of silicon of which the main body is of one of these types while a thin surface layer, separated from the main body by a high resistance barrier, is of the other type. For methods of preparing such silicon as well as for certain uses of the same, reference may be made to an application of J. H. Scaff and H. C. Theuerer, filed December 24, 1947, Serial No. 793,744, and to United States Patents 2,402,662 and 2,402,839 to R. S. Ohl. Such materials are known to be of use as rectifiers and as light sensitive devices both of the photo-voltaic and photo-conductive types. They are also believed to be of use in connection with amplifiers of the type described in the aforementioned application of J. Bardeen and W. H. Brattain.

However, such materials are open to the objection that they are unable to withstand high back voltages (in the rectifier sense of the word) without breakdown. On the other hand, it is known how to prepare germanium by a process such that it can be made to withstand back voltages of several hundred volts. This high back voltage characteristic of germanium constitutes a very real advantage for certain purposes, in particular for the purposes of an amplifier unit as described in the aforementioned application of J. Bardeen and W. H. Brattain. However, so far as is known, the surface of a germanium block of one conductivity type has never been provided with a sufficiently thin surface layer of the other conductivity type, separated from the body of the block by a barrier. In particular, it has not been known how to form a thin layer having P-type conductivity characteristics on a germanium block the main body of which has N-type characteristics, i. e., those which exhibit the high back voltage behavior.

Processes which have been developed for the formation of P-type layers on N-type silicon or N-type layers on P-type silicon fail to produce the desired result when applied without modification to germanium. This is because the chemical properties of germanium are different from those of silicon. Therefore, if a thin surface layer having one type of conductivity characteristic is to be formed on the surface of a block of germanium having the other type, a new process must be devised.

The present invention provides a method and process for forming a very thin layer of P-type material on the surface of a block of N-type germanium, the layer being separated from the main body of the block by a high resistance barrier.

The material which it is preferred to employ for the purposes of the invention and the treatment of it which is preliminary to the process of this invention form the subject-matter of the aforementioned joint application of J. H. Scaff-H. C. Theuerer, filed December 29, 1945, Serial No. 638,351. They are further described in "Crystal Rectifiers," by H. C. Torrey and C. A. Whitmer, Radiation Laboratory Series, vol. 15 (McGraw-Hill, 1948). Briefly, germanium dioxide is placed in a graphite crucible and reduced to germanium in a furnace in an atmosphere of hydrogen. After a prolonged low heat, the temperature is raised to 1,000° C. at which the germanium is liquefied and substantially complete reduction takes place. The charge is then rapidly cooled to room temperature, whereupon it may be broken into pieces of convenient size for the next step. The charge is now placed in a graphite crucible and heated to liquefaction in an induction furnace in an atmosphere of pure dry helium and then slowly cooled from the bottom upwardly by raising the heating coil at the rate of about ⅛ inch per minute until the charge has fully solidified. It is then cooled to room temperature.

The ingot is next soaked at a low heat of about 500° C. for 24 hours in a neutral atmosphere, for example of helium, after which it is allowed to cool to room temperature.

In the resulting heat treated ingot, various parts or zones are of various characteristics. In particular, the central part of the ingot is of N-type material which, by further processing, can be made to withstand a back voltage, in the sense in which this term is employed in the rectifier art, of 100 to 200 volts. It is this material which it is preferred to employ in connection with the present invention.

The material is next cut into blocks of suitable size and shape for use in connection with a light sensitive device, a solid rectifier unit, a barrier layer amplifier, or the like. A suitable block has the shape of a disc of about ¼ inch diameter and $\frac{1}{32}$ inch thickness. The block is then ground on both flat sides, first with 280 mesh abrasive dust, for example carborundum, and then with 600 mesh. It is then etched for one minute. The etching solution may consist of 10 cc. of concentrated nitric acid, 5 cc. of commercial standard (50 pc.) hydrofluoric acid and 10 cc. of water, in which a small amount, e. g., 0.2 gm. of copper nitrate has been dissolved. It is this etching treatment which appears to enable the block to withstand high (rectifier) back voltages without injury.

In accordance with the present invention, one side of the block is now provided with a coating of metal, for example copper or gold, which constitutes an ohmic (non-rectifying) electric contact. This may be done by evaporation or electroplating in accordance with well-known techniques. As a precaution against contamination of the other (unplated) side of the block which may have occurred in the course of the plating process, the unplated side may then be subjected to a repetition of the etching process.

The block is now given an anodic oxidation treatment which may be carried out with the apparatus of Fig. 1. The block 1 is placed, plated side 2 down, on a metal bed plate 3 which is connected to the positive terminal of a source of voltage such as a standard commercial dry battery 4. That part of the upper (unplated) surface on which it is desired to form a P-type layer is covered with an electrolyte 6, preferably one which is viscous and in which germanium dioxide is insoluble. Polymerized glycol borate meets both of these requirements. An electrode 7 of inert metal such as silver is dipped into the liquid without touching the surface of the block and is connected to a negative terminal of the battery 4 of about −10 to −20 volts, for example the −22.5 volt terminal. Current commences to flow, with a magnitude of about 1 milliampere for each square centimeter of the block surface, falling to about 0.2 milliampere per cm.$^2$ in about 4 minutes. When this has occurred, as determined by a milliammeter 8 or a clock 9, the electrode is disconnected from the −22.5 volt terminal and connected to the −45 volt battery terminal. The initial current is about 0.7 milliampere per cm.$^2$, falling to 0.2 milliampere per cm.$^2$ in about 6 minutes. The electrode is then connected to the −90 volt battery terminal. The initial current is now about 0.5 milliampere per cm.$^2$, falling to about 0.15 milliampere per cm.$^2$ in 10 to 20 minutes. This step is repeated as often as necessary to obtain a P-type layer of the desired thickness. A switch 10 may be included in the circuit to facilitate the connection changes.

Figure 2:
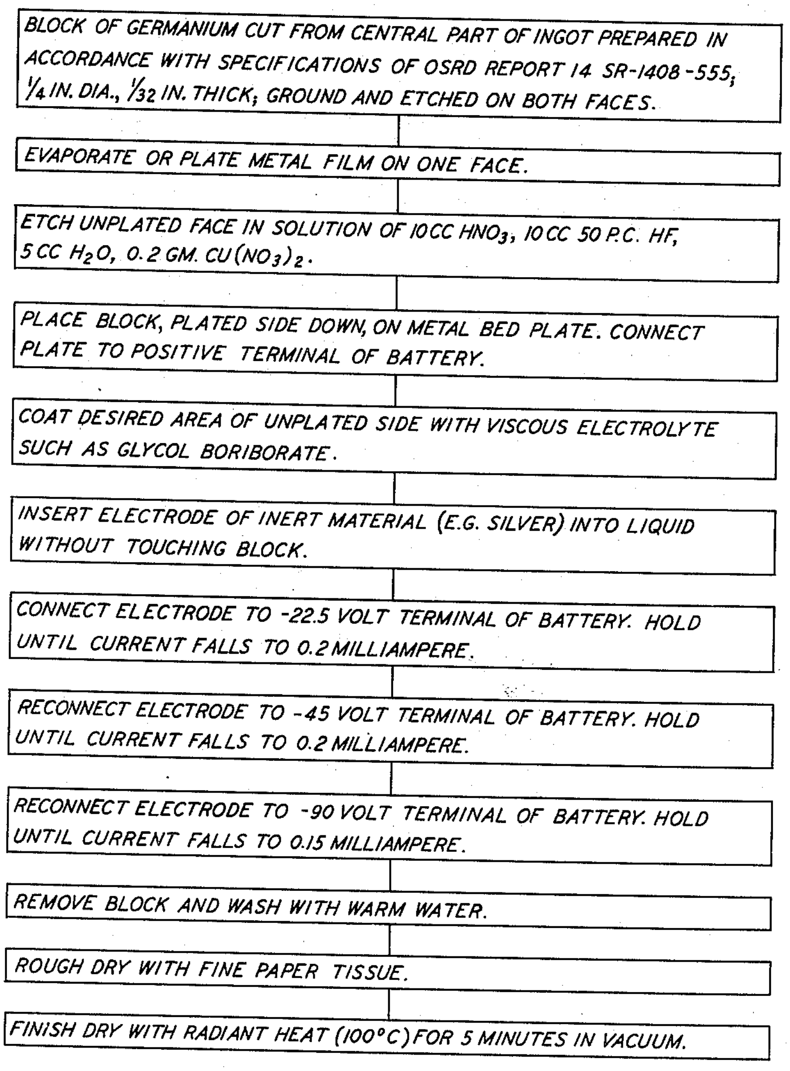
Fig. 2 is an operational diagram outlining one form of the method employed for treating germanium in accordance with this invention.

The battery 4 is now disconnected, the block 1 is removed and washed clean of the electrolyte 1 and dried with fine paper tissue. The washing may be done with warm water, which incidentally removes any germanium dioxide which may have formed on the surface. If for any reason it is preferred that the oxide film remain, the washing may be done with alcohol instead. Finish drying has been successfully carried out by placing the block in a vacuum chamber and applying radiant heat at a surface temperature of 100° C. a few minutes. Either the heat or the vacuum may be sufficient but both together are known to be. The successive steps of the foregoing process are tabulated in the operational diagram, Fig. 2.

If spot electrodes are required on the upper surface for electrode connections they may be evaporated on in the course of the finish drying process.

Theory and experiment indicate that the foregoing process converts a very thin layer of the unplated surface of the germanium block 1, perhaps $10^{-5}$ cm. in thickness, from the original N-type material of the block to P-type material. This hypothesis at least appears to explain many of the remarkable results which have been obtained as fully set forth in the aforementioned application of J. Bardeen and W. H. Brattain.

Figure 3:
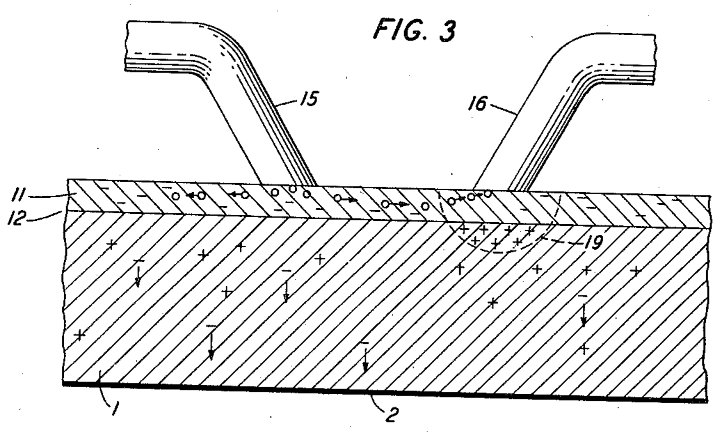
Fig. 3 is a sectional view, greatly enlarged, of a body of germanium material treated in accordance with the invention.

Fig. 3 is a sectional view, to a greatly enlarged scale, of a block of germanium prepared in accordance with the invention, showing a thin surface layer 11 of P-type material containing fixed negative charges and mobile positive charges, and a high resistance barrier 12 which separates this surface layer from the main body of the block 1 which has N-type characteristics containing fixed positive charges and mobile negative charges.

Figure 4:
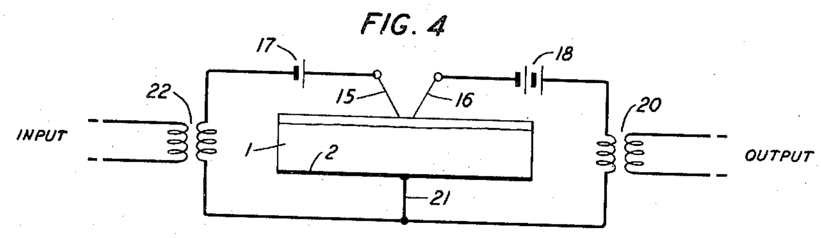
Fig. 4 is a schematic diagram illustrating one use of a block of germanium material which has been treated in accordance with the invention.

Fig. 4 shows the same block 1 connected in an amplifier circuit as described and claimed in the aforementioned application of J. Bardeen and W. H. Brattain. As shown in the figures, two metallic electrodes 15, 16 are placed in contact with the P-type surface layer 11 of the block 1, one 15, biased by a battery 17 to a slightly positive voltage with respect to the body of the block 1 and the other 16, biased by a battery 18 to a much larger negative voltage. In use, the positively biased electrode 15, which is preferably a point contact, serves as an emitter of positive charges into the P-type surface layer 11. Because of the comparatively high conductivity of the material of this layer and of the much higher resistance of the intermediate barrier 12, these positive charges or "holes" tend to flow away from the emitter electrode 15 in all directions before crossing the barrier 12. Some of them flow in the neighborhood of the negatively biased electrode 16 which may be termed a collector. This electrode may be a point like the emitter, and in any event is preferably of the non-ohmic or rectifier type. Because of the fixed positive charges in the N-type main body of the block 1, a very strong electric field exists across the thin surface layer 11 between that part of the N-type body material which lies in the vicinity of the collector 16 and the negatively biased collector itself. This field is illustrated in Fig. 3 by a broken line 19. Positive charges or holes which enter the region in which this field exists are drawn to the collector 16. Thus, a current is established in an external circuit interconnecting the emitter and the collector, and a voltage is established across a load impedance 20 which is included in the circuit.

A third connection 21 is made by soldering or otherwise to the plated film 2 on the face of the block opposite to that which bears the P-type layer. This electrode is termed the control electrode.

Evidently the proportion of the emitter current which is collected by the collector 16 depends on the distance which separates these two electrodes. When they are very close together, for example, 1 to 3 mils, the ratio of the collector current to the emitter current is perhaps 50 per cent. This ratio may be greatly increased by modifying the collector electrode construction. For example, in place of a single metal electrode 16, two or more collector electrodes may be symmetrically disposed about the emitter 15 and connected in parallel. If preferred the collector electrode may take the form of a ring making line contact with the surface of the P-type layer 11 and completely surrounding the emitter 15 but insulated from it. With such a construction, substantially 100 per cent of the emitter current is collected by the collector.

The resistance of the barrier 12, and therefore of the emitter-control electrode circuit, may be increased by restricting the area of the formed P-type layer to a comparatively small region surrounding the emitter and the collector. To this end it is only necessary to restrict the area of the block which is covered by the electrolyte in the forming process. Fig. 1 shows about one-half the area covered.

As explained in the aforementioned Bardeen-Brattain application, the emitter current may be varied over wide ranges by a signal voltage connected between the emitter electrode and the plated film 2 on the lower surface of the germanium block which serves as a control electrode. It is also explained that the internal impedance of the collector 16 is high, so that it may be externally matched with a load impedance which is also high. Thus, when a comparatively small signal voltage is applied between emitter and the control electrode for example by way of a transformer 22, an amplified replica of the signal appears across the load impedance 20.

While the block as prepared in the foregoing manner is suitable for use as an amplifier unit in the circuit of Fig. 4, or in various other circuit connections, its operation can generally be improved by an electrical aging process in which a potential in excess of the peak back voltage is applied to each of the point electrodes 15, 16, i. e., between it and the control electrode 21. The unit is protected from injury by heavy currents by inclusion of a resistor in series. The effect of this treatment is believed to lie in a concentrated heating of the material in the immediate neighborhood of the point, and so in an improvement of the electrical characteristics of the contacts.

The reasons for concluding that the results of the foregoing anodic oxidation process is to form a thin layer 11 of P-type material at the surface of the block, separated from the main body of the block 1 by a barrier 12 are as follows:

Potential probe measurements on the surface of the block, when the emitter 15 is biased to about 1 volt positive with respect to the control electrode 21 and the collector is disconnected, indicate that the emitter current travels on or close to the surface of the block, substantially laterally in all directions away from the emitter before crossing the barrier 12. Because it is known that a barrier which separates N-type material from P-type material is of high resistance as compared with P-type material, these measurements indicate the presence of a P-type layer at the surface of the block. Furthermore, with feather-weight forces on the contact points and with small fractions of a volt applied to them, P-type rectifier characteristics have sometimes been obtained. (P-type and N-type rectifier characteristics and their significance and differences are discussed in United States Patent 2,402,839 to R. S. Ohl.) But when the mechanical force on the contact point is increased to 10 grams or so, or as the voltage applied to it is raised to one half volt or so, the rectifier characteristic is observed suddenly to shift from P-type to N-type.

While the invention has been described in connection with an anodic oxidation process, it is believed that other processes may also produce the desired result. Variations of the magnitudes of the voltage steps, of their duration and of their number are contemplated as not departing from the invention. Likewise substitution of the application of a continuous voltage which is gradually varied in magnitude in such a way as to maintain the anodic current substantially constant for a suitable period is within the spirit of the invention, as are also other modifications in detail of the process of the invention whose scope is defined in the appended claims.

What is claimed is:

1. The process of treating a block of high back voltage germanium of N-type conductivity characteristics to form on its surface a thin layer having P-type characteristics and separated from the body of the block by a high resistance barrier which comprises coating the face to be modified with a liquid electrolyte in which germanium dioxide is insoluble, applying to the electrolyte a voltage which is negative with respect to the body of the block and of magnitude such as to cause an initial current of about 1 milliampere to flow, maintaining this voltage unchanged until the current falls to a value of about 0.2 milliampere, increasing the negative voltage applied to the electrolyte to a value such that a current of 1 milliampere again flows, maintaining this voltage until the current has decreased to a value of about .2 milliampere, repeating this step until a P-type layer of desired thickness shall have formed, and thereafter removing all electrolyte and oxidation products from the block.

2. The process of treating a block of high back voltage germanium of N-type to form on its surface a thin layer having P-type characteristics and separated from the body of the block by a high resistance barrier which comprises coating the face to be modified with a liquid electrolyte in which germanium dioxide is insoluble, applying to the electrolyte a voltage which is negative with respect to the body of the block and of magnitude such as to cause an initial current of about 1 milliampere to flow, maintaining this voltage unchanged until the current falls to a value of about .2 milliampere, increasing the negative voltage applied to the electrolyte to a value such that a current of 1 milliampere again flows, maintaining this voltage until the current has decreased to a value of about .2 milliampere, repeating this step until a P-type layer of desired thickness shall have formed, washing the block with warm water, and fully drying the block.

3. The process of treating a block of high back voltage germanium of N-type to form on its surface a thin layer having P-type characteristics and separated from the body of the block by a high resistance barrier which comprises coating the face to be modified with a viscous liquid electrolyte in which germanium dioxide is to a large extent insoluble, applying to the electrolyte a voltage which is negative with respect to the body of the block and of magnitude such as to cause an initial current of about 1 milliampere to flow, maintaining this voltage unchanged until the current falls to a value of about .2 milliampere, increasing the negative voltage applied to the electrolyte to a value such that a current of 1 milliampere again flows, maintaining this voltage until the current has decreased to a value of about .2 milliampere, repeating this step until a P-type layer of desired thickness shall have formed, removing all oxidation products by washing the block with warm water, rough drying with fine tissue, and finish drying with radiant heat in a vacuum.

4. The process of altering the conductivity type of a thin surface layer of a slab of N-type high back voltage germanium which comprises coating the face to be modified with a liquid electrolyte comprising polymerized glycol borate, inserting an electrode of inert metal in the electrolyte, applying to the electrode a potential which is negative with respect to the body of the slab, increasing this negative voltage in steps from 20 to 90 volts, and holding it unchanged at each step for 1 to 10 minutes, and thereafter removing all oxidation products.

5. The process of altering the conductivity type of a thin surface layer of a slab of N-type high back voltage germanium which comprises coating the face to be modified with a liquid electrolyte in which germanium dioxide is to a large extent insoluble, applying to the electrolyte a potential which is negative with respect to the body of the slab, increasing this negative voltage in steps from 10 to 100 volts and holding it unchanged at each step for 1 to 10 minutes, and thereafter removing all oxidation products.

6. The process of altering the conductivity type of a thin surface layer of a slab of N-type high back voltage germanium which comprises coating the face to be modified with a liquid electrolyte in which germanium dioxide is to a large extent insoluble, applying to the electrolyte a potential which is negative with respect to the body of the slab and of a magnitude such as to cause a current of 1 milliampere per square centimeter of block surface to flow and increasing this negative voltage in a manner to hold this current approximately constant until a P-type surface layer of desired thickness has been formed, and thereafter removing all oxidation products.

7. The process of altering the conductivity type of a thin surface layer of a slab of N-type high back voltage germanium which comprises coating the face to be modified with a liquid electrolyte in which germanium dioxide is to a large extent insoluble, applying to the electrolyte a potential which is negative with respect to the body of the slab and of a magnitude such as to cause a current of 1 milliampere for each square centimeter of block surface to flow and increasing this negative voltage in a manner to hold this current approximately constant for a period of about 30 minutes, and thereafter removing all oxidation products.

8. The process of forming a layer of P-type material at the surface of a slab of N-type high back voltage germanium which comprises coating the face to be modified with a liquid electrolyte in which germanium dioxide is insoluble, applying to the electrolyte a potential which is negative with respect to the body of the slab and of a magnitude such as to cause a current of 1 milliampere for each square centimeter of block surface to flow, increasing this negative voltage in a manner to hold this current approximately constant for a period of about 30 minutes, and thereafter washing away the electrolyte and all oxidation products with a liquid in which germanium dioxide is soluble.

9. A block of high back voltage germanium material of which the main body is of N-conductivity type, having on a surface thereof a thin layer of the order of $10^{-5}$ cm. in thickness whose characteristics are of the P-type, separated from the body of the block by a high resistance barrier.

ROBERT B. GIBNEY.

REFERENCES CITED

The following references are of record in the file of this patent:

UNITED STATES PATENTS

| Number | Name | Date |
|---|---|---|
| 1,751,362 | Ruben | Mar. 18, 1930 |
| 2,356,094 | Saslaw | Aug. 15, 1944 |
| 2,419,561 | Jones et al. | Apr. 29, 1947 |
| 2,438,944 | Ransley | Apr. 6, 1948 |
| 2,447,829 | Whaley | Aug. 24, 1948 |
| 2,476,323 | Rack | July 19, 1949 |

OTHER REFERENCES

Electronics, February 1946, pages 118–123.